(12) United States Patent
Yamagishi

(10) Patent No.: US 11,135,984 B2
(45) Date of Patent: Oct. 5, 2021

(54) VEHICLE BODY REAR STRUCTURE

(71) Applicant: HONDA MOTOR CO., LTD., Tokyo (JP)

(72) Inventor: Hideaki Yamagishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 111 days.

(21) Appl. No.: 16/624,502

(22) PCT Filed: Mar. 27, 2018

(86) PCT No.: PCT/JP2018/012294
§ 371 (c)(1),
(2) Date: Dec. 19, 2019

(87) PCT Pub. No.: WO2019/003528
PCT Pub. Date: Jan. 3, 2019

(65) Prior Publication Data
US 2020/0172180 A1  Jun. 4, 2020

(30) Foreign Application Priority Data
Jun. 29, 2017 (JP) .............................. JP2017-127972

(51) Int. Cl.
| | |
|---|---|
| *B60R 13/08* | (2006.01) |
| *B62D 35/02* | (2006.01) |
| *B62D 25/20* | (2006.01) |
| *B62D 43/10* | (2006.01) |
| *C09D 5/08* | (2006.01) |

(52) U.S. Cl.
CPC ........ *B60R 13/0861* (2013.01); *B60R 13/083* (2013.01); *B62D 25/20* (2013.01); *B62D 35/02* (2013.01); *B62D 43/10* (2013.01); *C09D 5/08* (2013.01)

(58) Field of Classification Search
CPC ... B60R 13/08; B60R 13/083; B60R 13/0861; B62D 25/20; B62D 35/02; B62D 43/10
USPC ...................................... 296/37.2, 39.1, 39.3
See application file for complete search history.

(56) References Cited

FOREIGN PATENT DOCUMENTS

| EP | 2103507 A1 * | 9/2009 | ............ B62D 35/02 |
|---|---|---|---|
| JP | S53-133819 A | 11/1978 | |
| JP | S60-50085 U | 4/1985 | |
| JP | S62-185181 U | 11/1987 | |
| JP | 2009-096345 A | 5/2009 | |
| JP | 2013-052696 A | 3/2013 | |

OTHER PUBLICATIONS

International Search Report by ISA/JP dated Jun. 19, 2018, on PCT/JP2018/012294 (5 pages).
Written Opinion by ISA/JP dated Jun. 19, 2018, on PCT/JP2018/012294 (6 pages).

* cited by examiner

*Primary Examiner* — Jason S Daniels
(74) *Attorney, Agent, or Firm* — Rankin, Hill & Clark LLP

(57) ABSTRACT

A vehicle body rear structure includes: a cross member and a curvature portion each formed by a part of a floor panel, the part projecting downward at a rearward portion (spare tire pan) of the floor panel, wherein the cross member and the curvature portion each constitute a projected portion; and an underbody coating applied to the projected portions and having a first step and a second step which are oriented perpendicular to a front-rear direction.

5 Claims, 4 Drawing Sheets

VEHICLE BODY REAR STRUCTURE

TECHNICAL FIELD

The present invention relates to a vehicle body rear structure.

BACKGROUND ART

Conventionally, there is known a vehicle body with a lower part structure having a structural member with an opening at a lower face of a front part of the vehicle body, wherein the opening is closed by a sealing member and an underbody coating is applied to the lower part structure so as to cover the sealing member (see, for example, Patent Document 1).

According to the lower part structure, an uneven surface formed on the lower face of the vehicle body front part can be made smooth by the underbody coating to reduce the occurrence of a wind breaking sound during traveling of the vehicle.

PRIOR ART DOCUMENT

Patent Document

Patent Document 1: Japanese Patent Application Laid-Open No. 2013-52696

SUMMARY OF THE INVENTION

Problem to be Solved by the Invention

Incidentally, in general, an underbody coating is applied to a lower face of a vehicle body rear part for the purposes of waterproofing, dust reductions, corrosion protection, and anti-chipping protection (prevention of collision with scattered stones or the like).

When an underbody coating is applied to the lower face of the vehicle rear part, an uneven surface of the lower face of the vehicle body can be made smooth, as described above. In this case, the airflow (travel wind) occurring during traveling of the vehicle flows along the smoothed lower surface of the vehicle body. The travel wind having flowed along the lower surface of the vehicle body is blocked by a lower end portion of a rear bumper arranged at the rear part of the vehicle.

This increases the air resistance value Cd of the vehicle, resulting in an increase in the fuel consumption.

On the other hand, further reduction in fuel consumption is desired due to the recent demands for energy saving and $CO_2$ emission reduction.

An object of the present invention is to provide a vehicle body rear structure that can achieve further reduction in the fuel consumption of vehicles.

Solution to Problem

A vehicle body rear structure that has achieved the above-described object includes: a projected portion formed by a part of a floor panel, the part projecting downward at a rearward part of the floor panel; and an underbody coating applied to the projected portion and having a step oriented perpendicular to a front-rear direction.

Effect of the Invention

According to the vehicle body rear structure of the present invention, a vehicle body rear structure by which a further reduction in fuel consumption of a vehicle can be achieved can be provided.

MODE FOR CARRYING OUT THE INVENTION

Figure 1:
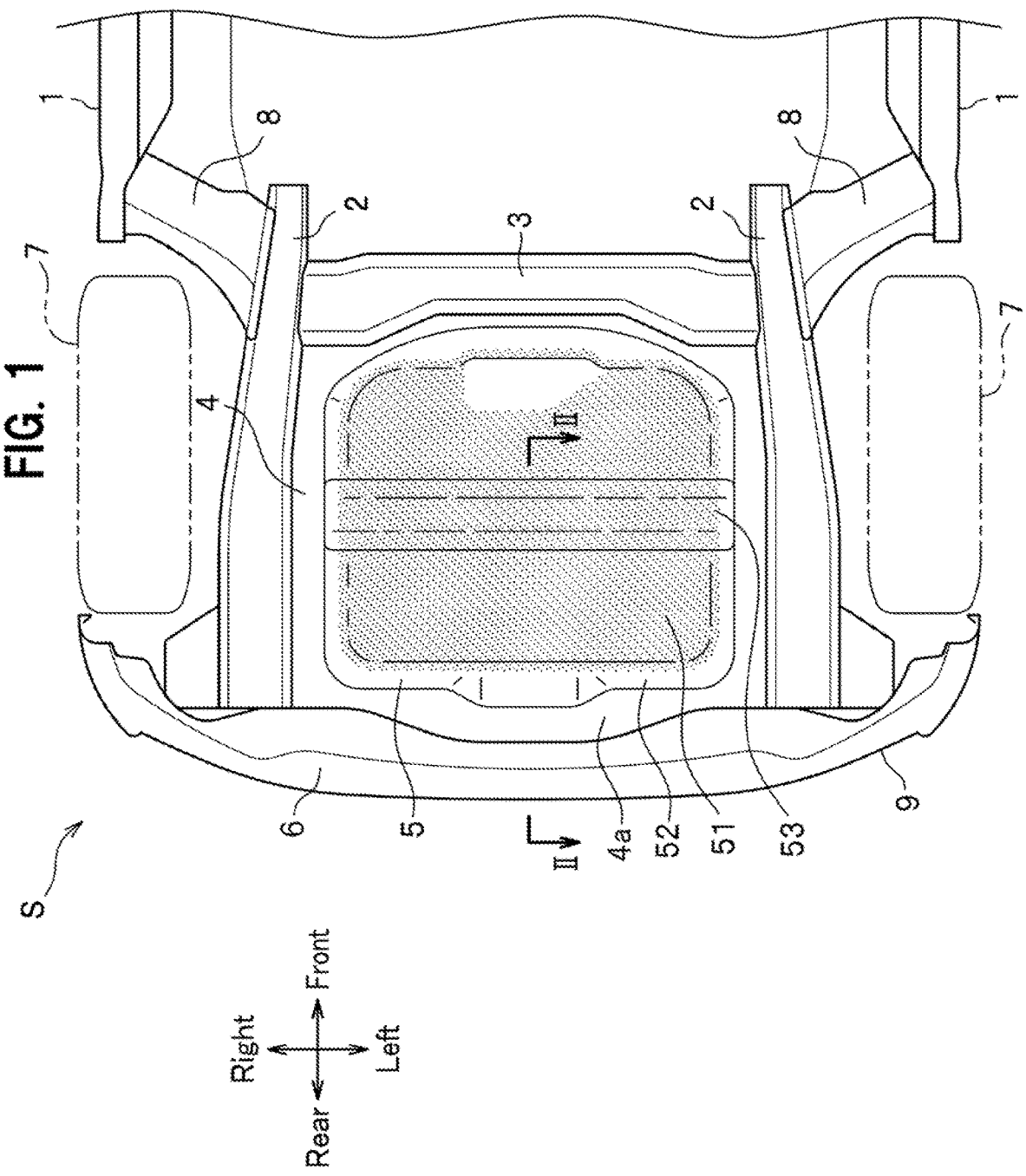
FIG. 1 is a bottom view schematically illustrating a vehicle body rear structure of an embodiment of the present invention.

A vehicle body rear structure of an embodiment according to the present invention will be described below in detail with reference to the drawings as appropriate. The embodiment is hereinafter called present embodiment.

The vehicle body rear structure of the present embodiment includes: a projected portion formed by a part of a floor panel, the part projecting downward at a rearward part of the floor panel; and an underbody coating applied to the projected portion and having a step oriented perpendicular to a front-rear direction.

Firstly, a description will be given of the whole structure of the vehicle body rear structure and thereafter a description will be given of the spare tire pan and the underbody coating.

It should be noted that "front-rear," "up-down" and "left-right" indicated with arrows in the drawings represent a front-rear direction of a vehicle body, an up-down direction of the vehicle body, and a left-right direction (vehicle width direction) seen from a driver's seat, respectively.

<Overall Configuration of Vehicle Body Rear Structure>

As shown in FIG. 1, a vehicle body rear structure S of the present embodiment has: sidesills 1 that extend in the front-rear direction respectively at two sides of a vehicle body 9, rear side frames 2 that extend rearward respectively from rear portions of the sidesills 1, a rear floor crossbeam 3 that connects between front portions of the rear side frames 2, a rear floor panel 4 located rearward of the rear floor crossbeam 3 and between the rear side frames 2, and suspension devices not shown. In FIG. 1, reference numerals 7 designate tires represented by virtual lines (alternate long and two short dashes line). Reference numeral 5 designates the spare tire pan described in detail later. The spare tire pan 5 is included in the rear floor panel 4.

Each of the sidesills 1 is composed of a sidesill inner part (not shown) and a sidesill outer part (not shown), which are located respectively on the inner and outer sides in the vehicle width direction and joined to form a hollow space therebetween, and between which a sidesill stiffener (not shown) is disposed.

Although not shown, the sidesills 1 extend to the vicinity of a dashboard lower part located in a vehicle body front part.

The rear side frames 2 each have a rectangular closed cross section. Each of the rear side frames 2 is located inward of the corresponding sidesill 1 in the vehicle width direction and extends in the front-rear direction.

Each of the rear side frames 2 has a front portion connected with a rear portion of the corresponding sidesill 1 via an outrigger 8.

Each rear side frame 2 has a rear end portion connected via a bumper beam extension (not shown) with a corresponding one of two end portions of a rear bumper (bumper beam) 6 extending in the vehicle width direction.

The rear floor crossbeam 3 extends in the vehicle width direction between the rear side frames 2 and connects between the front portions of the rear side frames 2 as described above.

The rear floor crossbeam 3 of the present embodiment has an upwardly-opening hat shape in cross-sectional view, such that a closed cross section is defined between the rear floor crossbeam 3 and the lower surface of the floor (front floor panel) of the vehicle compartment. The rear floor crossbeam 3 includes flanges which correspond to the brim of the hat shape and which are joined to the lower surface of the floor by welding or the like.

<Spare Tire Pan>

The spare tire pan 5 is formed on the rear floor panel 4, which is arranged between the rear side frames 2, as described above (see FIG. 1).

The spare tire pan 5 is formed by the rear floor panel 4 being shaped so as to bulge downward (toward the front side of the drawing sheet of FIG. 1), at the rear part of the vehicle body 9 (see FIG. 1).

In other words, as shown in FIG. 1, the spare tire pan 5 includes a bulge top face 51 and a rising side face 52 formed rising from a base surface 4a of the rear floor panel 4 and surrounding the bulge top face 51, in bottom view of the vehicle body 9.

Although not shown, the spare tire pan 5 has an upper surface side (on the back side of the drawing sheet of FIG. 1) in which a recessed portion is formed corresponding to the bulged portion. This recessed portion can be used to house stuff such as a spare tire, tool stuff, and/or a tire mending kit.

As shown in FIG. 1, the spare tire pan 5 includes a cross member 53 (bead portion) formed therein extending in the vehicle width direction at a position substantially central relative to the front-rear direction length of the spare tire pan 5. This cross member 53 is formed in a bar (rail) shape that projects downward (toward the front side of the drawing sheet of FIG. 1). This cross member 53 extends to traverse over the entire length of the spare tire pan 5 in the vehicle width direction.

Figure 2:
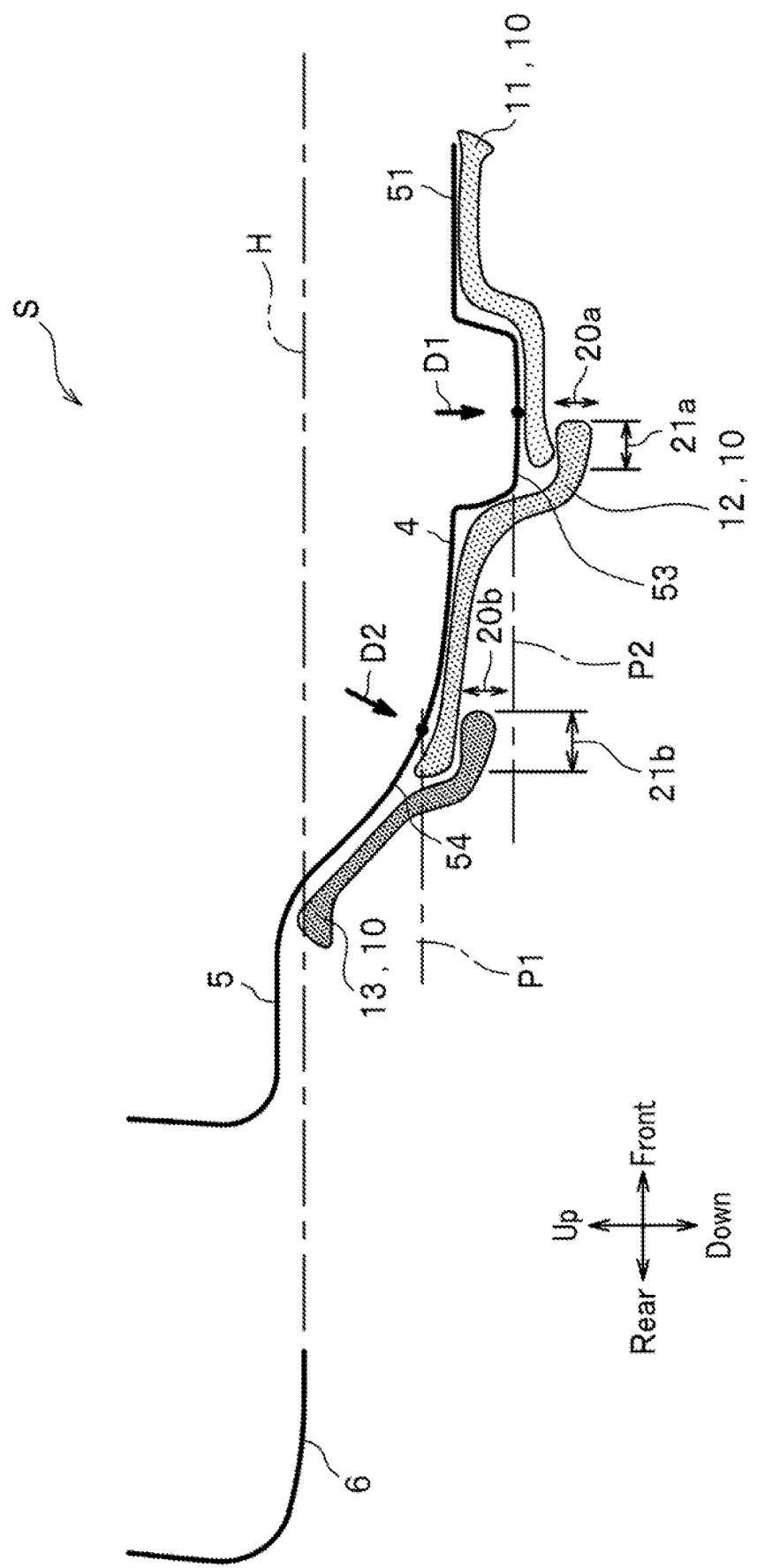
FIG. 2 is a schematic view showing the cross section taken along line II-II in FIG. 1.

FIG. 2 is a schematic view showing the cross section taken along line II-II in FIG. 1.

As shown in FIG. 2, the cross member 53 of the vehicle body rear structure S of the present embodiment is formed by a part of a plate member constituting the rear floor panel 4, the part projecting downward (in the direction D1). This cross member 53 is formed in a groove-like shape with an opening that opens upward in cross-sectional view. Specifically, the cross-sectional shape of the cross member 53 is approximately a trapezoid with equal-length two legs that spread upward. This cross member 53 and the curvature portion 54 described next correspond to the "projected portions" described in the claims.

The spare tire pan 5 includes a curvature portion 54 located rearward of the cross member 53.

The plate member constituting the rear floor panel 4 forms this curvature portion 54 in such a way that the plate member is projected by being curved with a predetermined curvature. Specifically, the curvature portion 54 of the present embodiment projects in a rearward and downward direction at an inclined angle (in the direction D2).

Incidentally, the curvature portion 54 of the present embodiment is formed rearward of and adjacent to the cross member 53. As described above, this curvature portion 54 corresponds to the "projected portions" described in the claims, together with the cross member 53.

The spare tire pan 5 is configured such that both the cross member 53 and the curvature portion 54, which each constitute the projected portion, are arranged below the height H of a lower end of the rear bumper 6.

The curvature portion 54, which is a projected portion on the rearward side, is set at a higher position than the cross member 53, which is a projected portion on the forward side. Specifically, the bulge central position P1 of the curvature portion 54 is set higher than the groove bottom central position P2 of the cross member 53.

<Underbody Coating>

An underbody coating 10 (see FIG. 2) is formed of a cured material of a resin composition for the underbody coating 10 that is applied to the lower surface of the spare tire pan 5 (see FIG. 2).

As shown in FIG. 2, the underbody coating 10 of the present embodiment is composed of, in order from front to rear, a first underbody coating 11, a second underbody coating 12, and a third underbody coating 13.

The first underbody coating 11 is applied, on the lower surface side of the spare tire pan 5, to the cross member 53 and a portion of the spare tire pan 5 that is located forward of the cross member 53, in such a manner that the first underbody coating 11 is continuous between the cross member 53 and the portion of the spare tire pan 5.

The second underbody coating 12 is applied, on the lower surface side of the spare tire pan 5, to the cross member 53 and an approximately front-half portion of the curvature portion 54, in such a manner that the second underbody coating 12 is continuous between the cross member 53 and the approximately front-half portion.

The third underbody coating 13 is applied, on the lower surface side of the spare tire pan 5, to an approximately rear-half portion of the curvature portion 54.

The underbody coating 10 according to the present embodiment is applied to the lower surface side of the spare tire pan 5 to control at least the flow direction of an airflow passing over the bulge top face 51, shown in FIG. 1, in a manner described later.

Specifically, as shown in FIG. 2, the first underbody coating 11, the second underbody coating 12, and the third underbody coating 13 together cover the entire of the cross member 53 and the entire of the curvature portion 54, each of which constitutes a projected portion.

As shown in FIG. 2, the underbody coating 10 has a step 20a and a step 20b arranged in the front-rear direction, at the cross member 53 constituting one projected portion and at the curvature portion 54 constituting another projected portion, respectively.

The step 20a at the cross member 53 is formed by an overlap 21a of a rear end portion of the first underbody coating 11 and a front end portion of the second underbody coating 12.

The step 20b at the curvature portion 54 is formed by an overlap 21b of a rear end portion of the second underbody coating 12 and a front end portion of the third underbody coating 13.

Specifically, the step 20a at the cross member 53 is formed such that the front end portion of the second underbody coating 12, located rearward of the first underbody coating 11, is stacked under the rear end portion of the first underbody coating 11, located forward of the second underbody coating 12.

In other words, the step 20a is formed so that the front end portion of the second underbody coating 12 is at a lower position than the rear end portion of the first underbody coating 11.

The step 20b at the curvature portion 54 is formed such that the front end portion of the third underbody coating 13, located rearward of the second underbody coating 12, is stacked under the rear end portion of the second underbody coating 12, located forward of the third underbody coating 13.

In other words, the step 20b is formed so that the front end portion of the third underbody coating 13 is at a lower position than the rear end portion of the second underbody coating 12.

In the present embodiment, the steps 20a and 20b preferably have a height of approximately 3 mm. However, the steps 20a and 20b may have a height of 10 mm or more.

<Vehicle Body Rear Structure Manufacturing Method>

In a manufacturing method of the vehicle body rear structure, the spare tire pan 5 (see FIG. 2) including the cross member 53 (see FIG. 2) constituting the one projected portion and the curvature portion 54 (see FIG. 2) constituting the another projected portion is formed by press forming.

Figure 3A:
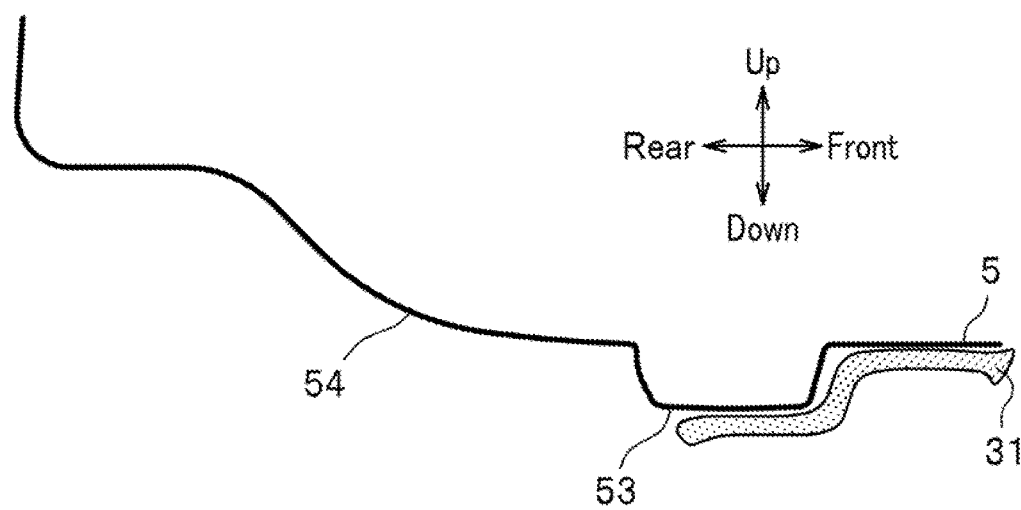
FIGS. 3A to 3C are explanatory views illustrating steps for forming the vehicle body rear structure.
Figure 3B:
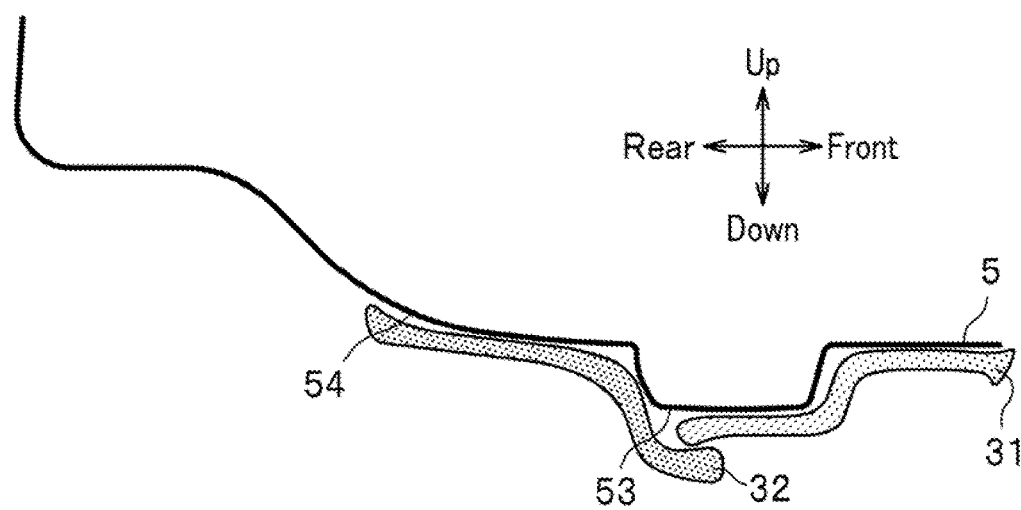
Figure 3C:
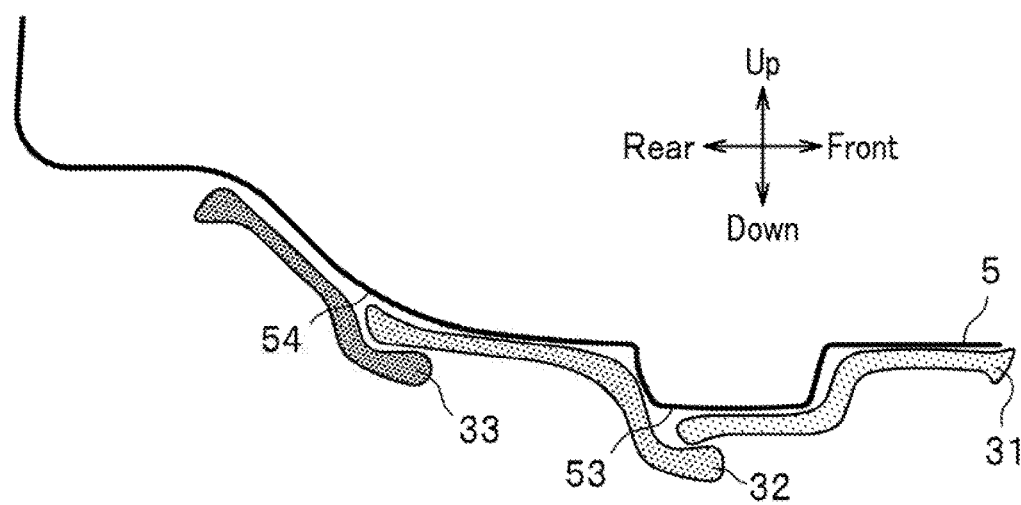

FIGS. 3A to 3C are explanatory views illustrating steps for forming the underbody coating 10.

As shown in FIG. 3A, in this manufacturing process, first, a first coating 31 is formed by applying a resin composition for the underbody coating 10 (see FIG. 2) firstly to the cross member 53 and then to a portion of the spare tire pan 5 that is located forward of the cross member 53.

The resin composition can be a known resin composition, examples of which includes one containing a base resin, a plasticizer, and a filler.

The application method for the resin composition is not particularly limited. However, it is preferable to use a method including masking the area excluding the region for application and then performing spray painting.

Next, in this manufacturing method, the first coating 31 is subjected to a heating process to semi-cure the first coating 31. The temperature of heating is preferably lower than that for a complete curing process performed later. For example, the temperature may be set to about 80° C. However, it is not limited thereto. It is preferable to use an infrared lamp as the heating means. However, it is not limited thereto.

Next, as shown in FIG. 3B, a second coating 32 is formed over the cross member 53 and an approximately front-half of the curvature portion 54. In this process, a front end portion of the second coating 32 is overlapped on a rear end portion of the first coating 31. After that, in this manufacturing method, the second coating 32 is subjected to a heating process to semi-cure the second coating 32. The temperature of the heating may be set to the same temperature as that for semi-curing the first coating 31.

Next, as shown in FIG. 3C, a third coating 33 is formed over an approximately rear-half of the curvature portion 54. In this process, a front end portion of the third coating 33 is overlapped on a rear end portion of the second coating 32.

Thereafter, in this manufacturing method, the first coating 31, the second coating 32, and the third coating 33 are subjected to a heating process to cure them completely. The temperature for the complete curing may be set to approximately 100° C. for example. However, it is not limited thereto. Incidentally, in the manufacturing method of to the present embodiment, a semi-curing process for the third coating 33 is not included. However, the third coating 33 may be subjected to a heating process to semi-cure the third coating 33 before the complete curing process.

In this way, by completely curing the first coating 31, the second coating 32, and the third coating 33, the spare tire pan 5 having the first underbody coating 11, the second underbody coating 12, and the third underbody coating 13 is completed as illustrated in FIG. 2.

<Advantageous Working Effects>

Next, a description will be given of advantageous working effects of the vehicle body rear structure S according to the present embodiment.

Figure 4:
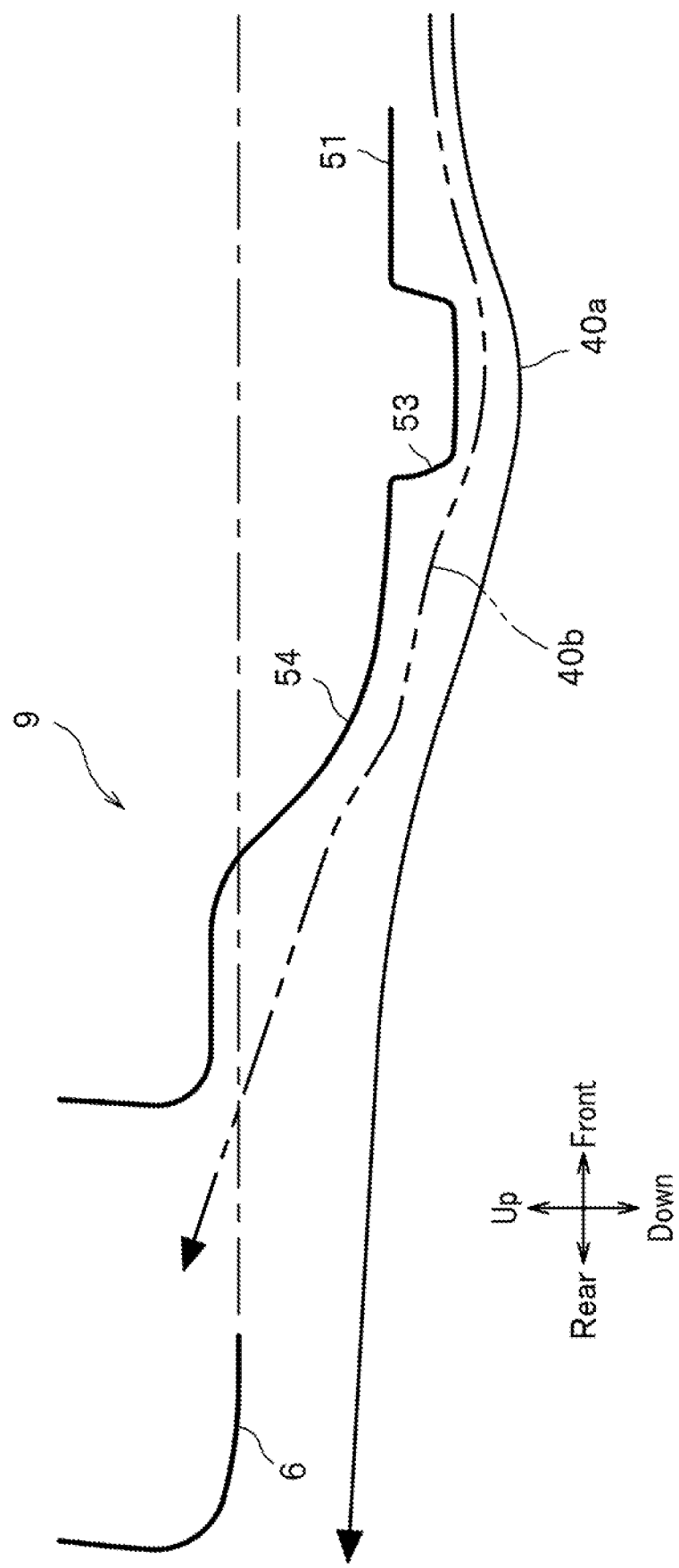
FIG. 4 is a schematic view illustrating flow lines of the travel wind flowing along a lower surface of a vehicle body during traveling of the vehicle.

FIG. 4 is a schematic view showing flow lines of the travel wind flowing along the lower surface of the vehicle body 9 during traveling of the vehicle. Note that, in FIG. 4, illustration of the underbody coating is omitted for the convenience of drawing.

In FIG. 4, reference numeral 40a designates a flow line of the travel wind flowing along the lower surface of the vehicle body 9 during traveling of a vehicle in which the vehicle body rear structure S (see FIG. 1) of the present embodiment is equipped. As shown in FIG. 2, the vehicle body rear structure S has the cross member 53 constituting the one projected portion and the curvature portion 54 constituting the another projected portion, each of which is formed by a part of the rear floor panel 4, the part projecting downward. The vehicle body rear structure S has the underbody coating 10 having the steps 20a and 20b (see FIG. 2) respectively located at the cross member 53 and the curvature portion 54.

In FIG. 4, reference numeral 40b designates a flow line of the travel wind flowing along the lower surface of the vehicle body 9 during traveling of a vehicle in which a comparative vehicle body rear structure (not shown) is equipped.

This comparative vehicle body rear structure has the same configuration as that of the vehicle body rear structure S (see FIG. 2) except that the underbody coating 10 (see FIG. 2) has no steps. In other words, the underbody coating 10 of the comparative vehicle body rear structure is formed on the lower surface of the spare tire pan 5 (see FIG. 2) without an overlap formed by the underbody coating 10 and has a substantially constant thickness.

The travel wind 40b (see FIG. 4) occurring in the case of the comparative vehicle body rear structure flows along the lower surface of the spare tire pan 5 (see FIG. 4) and then blocked by the rear bumper 6 (see FIG. 4).

In contrast, as shown in FIG. 4, in the case of the vehicle body rear structure S of the present embodiment, the step 20a (see FIG. 2) facilitates separation of the travel wind 40a when the travel wind 40a changes its flow direction downward at the cross member 53 constituting the one projected portion, and the step 20b (see FIG. 2) facilitates separation of the travel wind 40a when the travel wind 40a changes its flow direction downward at the curvature portion 54 constituting the another projected portion. In other words, the travel wind 40a flows in such a way as to separate from the surface of the underbody coating 10 (see FIG. 2). Due to this, the travel wind 40a is guided to flow below the rear bumper 6. As a result, the travel wind 40a is prevented from being blocked by the rear bumper 6.

Therefore, according to the vehicle body rear structure S (see FIG. 2) of the present embodiment, the air resistance value Cd is decreased, leading to a decrease in the fuel consumption.

According to the vehicle body rear structure S of the present embodiment, the steps 20a and 20b are formed by the overlaps 21a and 21b, at which end portions of parts of the underbody coating 10 are overlapped, as illustrated in FIG. 2.

With this vehicle body rear structure S, steps 20a and 20b can be easily formed respectively on the cross member 53 constituting the one projected portion and the curvature portion 54 constituting the another projected portion.

As shown in FIG. 2, in the vehicle body rear structure S according to the present embodiment, the cross member 53 constituting the one projected portion and the curvature portion 54 constituting the another projected portion are located below a lower end of the rear bumper 6.

According to this vehicle body rear structure S, even when a rear end of the rear floor panel 4 (see FIG. 1) and the rear bumper 6 have a large gap therebetween, the travel wind 40a (see FIG. 4) can be deflected downward to flow below the rear bumper 6.

As shown in FIG. 2, in the vehicle body rear structure S according to the present embodiment, the curvature portion 54, i.e., the projected portion on the rearward side, is located at a higher position than the cross member 53, i.e., the projected portion on the forward side.

According to this vehicle body rear structure S, even when the heights of the steps 20a and 20b are set relatively small, the travel wind 40a (see FIG. 4) can be deflected downward to flow below the rear bumper 6.

The vehicle body rear structure S according to the present embodiment includes the spare tire pan 5, on which the cross member 53 and the curvature portion 54 are formed in order from front to rear, as illustrated in FIG. 2. The underbody coating 10 includes the first underbody coating 11, the second underbody coating 12, and the third underbody coating 13 that together cover the entire of the cross member 53 constituting the one projected portion and the entire of the curvature portion 54 constituting the another projected portion.

In this vehicle body rear structure S, the cross member 53 serves to increase the rigidity of the spare tire pan 5 and defines the one projected portion at the lowest position of the spare tire pan 5.

According to this vehicle body rear structure S, the travel wind 40a (see FIG. 4) can be deflected downward to flow below the rear bumper 6, by the entire lower surface of the spare tire pan 5.

As shown in FIG. 2, in the vehicle body rear structure S according to the present embodiment, the steps 20a and 20b are each formed by stacking an end portion of a rearward part of the underbody coating 10 under an end portion of a forward part of the underbody coating 10 that is located forward of the rearward part.

According to this vehicle body rear structure S, each of the steps 20a and 20b can be firmly formed according to the thickness of the underbody coating 10 by the end portion of the corresponding rearward part of the underbody coating 10, which is overlapped on the end portion of the corresponding forward part of the underbody coating 10 and located thereunder.

According to this vehicle body rear structure S, the steps 20a and 20b can each be easily formed to have a large height by adjusting the thickness of the underbody coating 10. This makes it easy to create a structure which efficiently facilitates separation of the travel wind 40a (see FIG. 4).

Although an embodiment of the present invention has been described above, the present invention is not limited to the embodiment described above and can be carried out in various modes.

In the embodiment described above, two projected portions are defined by the cross member 53 and the curvature portion 54. However, three or more projected portions may be included in the structure according to the present invention.

Each of the steps 20a and 20b in the above-described embodiment is formed by an end surface of one part of the underbody coating 10 overlapped on another part of the underbody coating 10, which end surface rises roughly perpendicularly from a surface of the another part. However, the end surfaces of the underbody coating 10 defining the steps 20a and 20b are not limited thereto. They may each be formed of a tapered surface that guides the travel wind 40a (see FIG. 4) downward.

DESCRIPTION OF THE SYMBOLS 1 sidesill
2 rear side frame
3 rear floor crossbeam
4 rear floor panel (floor panel)
5 spare tire pan (rear part of floor panel)
6 rear bumper
8 outrigger
9 vehicle body
10 underbody coating
11 first underbody coating
12 second underbody coating
13 third underbody coating
20a step
20b step
53 cross member
54 curvature portion
S vehicle body rear structure

The invention claimed is:

1. A vehicle body rear structure comprising:
a projected portion formed by a part of a floor panel, the part projecting downward at a rearward part of the floor panel; and
an underbody coating applied to the projected portion and having a step oriented perpendicular to a vehicle front-rear direction,
wherein the step is formed by an overlap of end portions of parts of the underbody coating.

2. The vehicle body rear structure according to claim 1, wherein the projected portion is located below a lower end of a rear bumper.

3. The vehicle bod y rear structure according to claim 2, wherein the projected portion comprises a plurality of projected portions arranged in the vehicle front-rear direction, and
wherein the plurality of projected portions are configured so that one of the plurality of projected portions that is located rearwardly of another one the plurality of projected portions is set at a higher position than the another one.

4. The vehicle body rear structure according to claim 1, wherein the floor panel includes a spare tire pan having a cross member portion and a curvature portion, which are formed in order from front to rear as the projected portion, and wherein the underbody coating is applied to lower surfaces of the projected portion.

5. The vehicle body rear structure according to claim 1, wherein the step is formed such that an end portion of one of the parts of the underbody coating is stacked under an end portion of another one of the parts of the underbody coating, the one of the parts of the underbody coating being located rearward of the another one of the parts of the underbody coating.

* * * * *